United States Patent
Yamamoto et al.

[11] Patent Number: 5,949,443
[45] Date of Patent: Sep. 7, 1999

[54] EQUIPMENT WITH SCANNING TYPE CARRIER

[75] Inventors: Kosuke Yamamoto; Yoichi Tosaka; Kenichiro Hashimoto; Hirofumi Hirano, all of Yokohama, Japan

[73] Assignee: Canon Kabushiki Kaisha, Tokyo, Japan

[21] Appl. No.: 08/959,992

[22] Filed: Oct. 29, 1997

Related U.S. Application Data

[63] Continuation of application No. 08/499,126, Jul. 7, 1995, abandoned.

[30] Foreign Application Priority Data

Jul. 15, 1994 [JP] Japan ................................. 6-164430
May 29, 1995 [JP] Japan ................................. 7-130599

[51] Int. Cl.⁶ .......................... B41J 1/034; B41J 2/195; B41J 29/38
[52] U.S. Cl. .................................. 347/3; 347/7; 347/14
[58] Field of Search ................................. 347/104, 14, 29, 347/3, 7; 346/139 C; 400/82, 283, 286.3

[56] References Cited

U.S. PATENT DOCUMENTS 5,018,884  5/1991  Hirano et al. ............................. 347/30
5,166,708  11/1992  Hirano et al. ............................. 347/24
5,777,634  7/1998  Okamura et al. ........................... 347/7

FOREIGN PATENT DOCUMENTS 58-136450  8/1983  Japan .
1221251  9/1989  Japan .
2001327  1/1990  Japan .

*Primary Examiner*—N. Le
*Assistant Examiner*—Thinh Nguyen
*Attorney, Agent, or Firm*—Fitzpatrick, Cella, Harper & Scinto

[57] ABSTRACT

An equipment, which comprises a scanning type carrier for performing a scanning operation upon reception of a driving force, includes a first standby portion for holding a functional element in a standby state at one end portion side in the scanning direction of the scanning type carrier, a second standby portion for holding a functional element in a standby state at the other end portion side in the scanning direction of the scanning type carrier, a guide mechanism for allowing the scanning type carrier to be movable between the first and second standby portions, and a selector for selecting a functional element located at one of the first and second standby portions in correspondence with the operation mode of the equipment or the functional element driving signal, and integrating the selected functional element to the scanning type carrier.

18 Claims, 8 Drawing Sheets

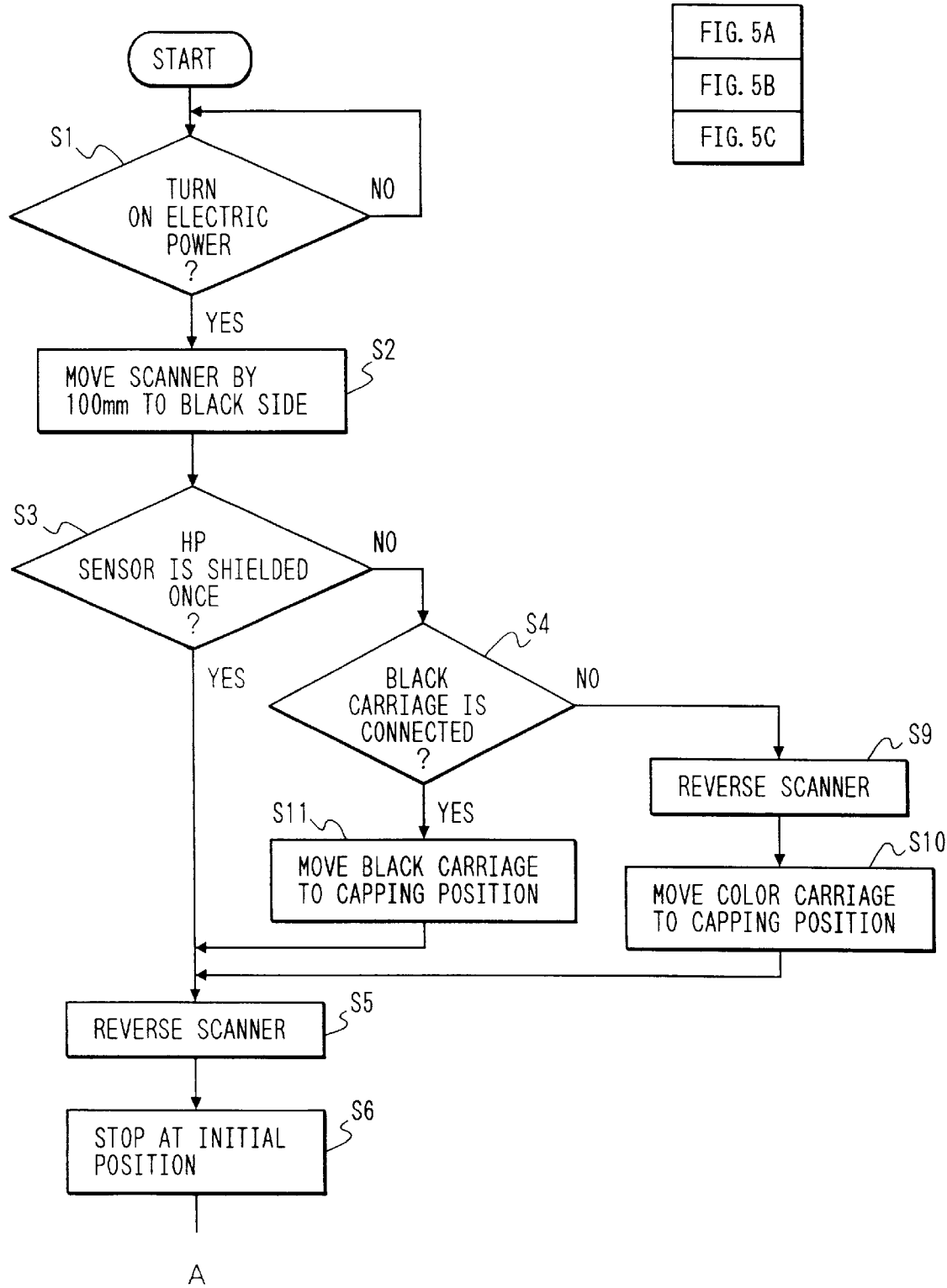

EQUIPMENT WITH SCANNING TYPE CARRIER

This application is a continuation of application Ser. No. 08/499,126, filed Jul. 7, 1995, now abandoned.

BACKGROUND OF THE INVENTION

1. Field of the Invention

The invention relates to an equipment with a scanning type carrier and, more particularly, to an equipment suitably used for scanning an ink-jet recording head, a reading sensor, and the like as functional elements.

2. Related Background Art

A conventional recording apparatus for performing recording by scanning an ink-jet recording head described in, e.g., Japanese Laid-Open Patent Application No. 1-221251 has an arrangement in which different heads (a head for an image scanner, recording heads for different colors, and a color recording head) are mounted on a plurality of carriages, and the driving control operations of these carriages are independently performed to scan them. A recording apparatus described in Japanese Laid-Open Patent Application No. 2-1327 has an arrangement in which recording heads are mounted on host and slave driving carriages, these carriages are connected to or disconnected from each other as needed, and the driving control operation of the host driving carriage is performed to select a scanning operation of only the host driving carriage or a concurrent scanning operation of both carriages. On the other hand, a recording apparatus described in Japanese Laid-Open Patent Application No. 58-136450 has an arrangement in which a holder for stationarily holding a recording head, which is to be exchangeably mounted on a carrier, so as to maintain a predetermined posture is arranged, and the recording head is attached/detached to/from the carrier while being stationarily held by the holder by means of the movement of the holder or the carrier and the operation of an attachment/detachment mechanism such as a chuck.

However, as described in Japanese Laid-Open Patent Application Nos. 1-221251 and 2-1327, in the arrangement comprising a plurality of carriages which mount heads, various operation modes corresponding to the types of heads mounted on the carriages can be obtained by selectively scanning the plurality of carriages, while the recording apparatus becomes bulky and the driving and control mechanisms are complicated due to the presence of the plurality of carriages. In the apparatus described in Japanese Laid-Open Patent Application No. 58-136450, since the holder stationarily holds the recording head in a posture upon mounting the head on the carrier, the posture of the recording head held by the holder and the positional relationship between the carrier and holder must be determined with high precision to allow accurate and smooth exchange of the head, and it is difficult to hold the recording head in a standby state with a simple mechanism, resulting in a complicated and large-scale apparatus as a whole.

SUMMARY OF THE INVENTION

It is an object of the present invention to provide an equipment with a scanning type carrier, which can obtain various operation modes according to the types of functional elements such as an ink-jet head, a reading sensor, and the like by selectively scanning these functional elements using a simple arrangement.

It is another object of the present invention to provide an equipment with a scanning type carrier, which can attain a simple and compact arrangement by holding functional elements such as an ink-jet head, a reading sensor, and the like in a standby state with a simple mechanism.

It is still another object of the present invention to provide an equipment with a scanning type carrier, which can selectively scan functional elements using the scanning type carrier, which elements stand by at first and second standby portions set to be separated from each other at one and the other end portion sides in a scanning direction of the scanning type carrier and are easily attached/detached to/from the carrier by only scanning the carrier in one or the other direction.

It is still another object of the present invention to provide an equipment with a scanning type carrier, which can selectively scan ink-jet heads which stand by at first and second standby portions set to be separated from each other at one and the other end portion sides in the scanning direction of the scanning type carrier, and which equipment comprises a cap mechanism for respectively capping the ink-jet heads.

It is still another object of the present invention to provide an equipment with a scanning type carrier, in which first and second standby portions are set to be separated from each other at one and the other end portion sides in a scanning direction of the scanning type carrier, the first standby portion is defined as a standby position exclusively used for a carriage for mounting an ink-jet head, and the second standby portion is defined as a standby position exclusively used for a carriage for mounting a functional element different from the ink-jet head.

It is still another object of the present invention to provide an equipment with a scanning type carrier, which can select functional elements which scan an information processing region while being integrated with the scanning type carrier, in accordance with an operation mode of the equipment or a driving signal for driving the functional elements.

It is still another object of the present invention to provide an equipment with a scanning type carrier, which comprises a scanning type carrier for performing a scanning operation upon reception of a driving force, a guide mechanism for allowing the scanning operation of the scanning type carrier, a first standby portion which can hold a functional element mounting carriage at one end portion side in a scanning direction of the scanning type carrier, and a second standby portion which can hold another functional element mounting carriage at the other end portion side, and in which the guide mechanism allows the scanning type carrier to be movable between the first and second standby portions, and the scanning type carrier is movable integrally with the functional element mounting carriage located at least at one of the first and second standby portions.

It is still another object of the present invention to provide an equipment with a scanning type carrier, which comprises a scanning type carrier for performing a scanning operation upon reception of a driving force, a guide mechanism for allowing the scanning operation of the scanning type carrier, a functional element mounting carriage which swingably engages with the guide mechanism, and a standby portion with a regulating mechanism for regulating the swing movement of the functional element mounting carriage at one end portion side in a scanning direction of the scanning type carrier, and in which the guide mechanism allows the scanning operation of the scanning type carrier on both the standby portion and an information processing region where the functional element performs its operation, and the scanning type carrier comprises an engaging mechanism for regulating the swing movement of the functional element mounting carriage while allowing the functional element mounting carriage located at the standby portion to be integrally movable.

It is still another object of the present invention to provide an equipment with a scanning type carrier, which comprises a scanning type carrier for performing a scanning operation upon reception of a driving force, a guide mechanism for allowing the scanning operation of the scanning type carrier, a functional element mounting carriage which swingably engages with the guide mechanism, and a standby portion with a regulating mechanism for regulating the swing movement of the functional element mounting carriage at one end portion side in a scanning direction of the scanning type carrier, and in which the guide mechanism allows the scanning operation of the scanning type carrier on both the standby portion and an information processing region where the functional element performs its operation, the scanning type carrier comprises an engaging mechanism for regulating the swing movement of the functional element mounting carriage so as to allow the functional element mounting carriage located at the standby portion to be integrally movable, and the functional element mounting carriage accepts engagement with the scanning type carrier so that a driving force receiving portion of the scanning type carrier is inserted in a projected space of the carriage in a direction perpendicular to the scanning direction.

It is still another object of the present invention to provide an equipment with a scanning type carrier, which comprises a scanning type carrier for performing a scanning operation upon reception of a driving force, a guide mechanism for allowing the scanning operation of the scanning type carrier, a functional element mounting carriage for mounting a functional element, and a standby portion for holding the functional element mounting carriage in a standby state at one end portion side in a scanning direction of the scanning type carrier, and in which the guide mechanism allows the scanning operation of the scanning type carrier on both the standby portion and an information processing region where the functional element performs its operation, the scanning type carrier allows the functional element mounting carriage located at the standby portion to be integrally movable, and the functional element mounting carriage performs regulated engagement for regulating the relative positional relationship with the scanning type carrier before accepting engagement for traction/disconnection by the scanning type carrier.

It is still another object of the present invention to provide an equipment with a scanning type carrier, which comprises a scanning type carrier, a guide mechanism for allowing a scanning operation of the scanning type carrier, a first standby position for holding a carriage, which can mount an ink-jet head, in a standby state at one end portion side in a scanning direction of the scanning type carrier, a second standby position for holding another carriage, which can mount an ink-jet head, in a standby state at the other end portion side, a first cap mechanism for capping the ink-jet head at the first standby position, and a second cap mechanism for capping the ink-jet head at the second standby position, and in which the guide mechanism allows the scanning type carrier to be movable between the first and second standby positions, and also allows the scanning type carrier to be movable integrally with the carriage for mounting the ink-jet head located at one of the first and second standby positions.

It is still another object of the present invention to provide an equipment with a scanning type carrier, which comprises a scanning type carrier, a guide mechanism for allowing a scanning operation of the scanning type carrier, a first standby position which is set at one end portion side in a scanning direction of the scanning type carrier and is exclusively used for a carriage which can mount an ink-jet head, and a second standby position which is set at the other end portion side and is exclusively used for a carriage which can mount a functional element different from the ink-jet head, and in which the guide mechanism allows the scanning type carrier to be movable between the first and second standby positions, and also allows the scanning type carrier to be movable integrally with the carriage located at one of the first and second standby positions.

It is still another object of the present invention to provide an equipment with a scanning type carrier, which comprises a scanning type carrier, a first standby position which can mount a first functional element at one end portion side in a scanning direction of the carrier, a second standby position which can mount a second functional element at the other end portion side, a guide mechanism for allowing a scanning operation of the scanning type carrier between the first and second standby positions, and selection means for selecting and integrating the functional element located at one of the first and second standby positions with the scanning type carrier in accordance with an operation mode of the equipment or the driving signal for the functional element.

DETAILED DESCRIPTION OF THE PREFERRED EMBODIMENTS

The preferred embodiments of an equipment according to the present invention will be described hereinafter with reference to the accompanying drawings.

In the present invention, terms are defined as follows. The "medium to be fed" includes a recording medium such as paper, an OHP sheet, a plastic sheet, coated paper, cloth, and the like, which preferably has flexibility and can hold an ink image formed by attached ink droplets, and a member such as an original sheet, which can hold an image on its surface. The "functional element" includes a recording head and a reading head. The "carriage" holds or mounts the functional element. The "carrier" is scanned upon reception of a driving force, and does not directly have the functional element. The "information processing region" includes a recording region and a reading region.

(First Embodiment)

Figure 1:
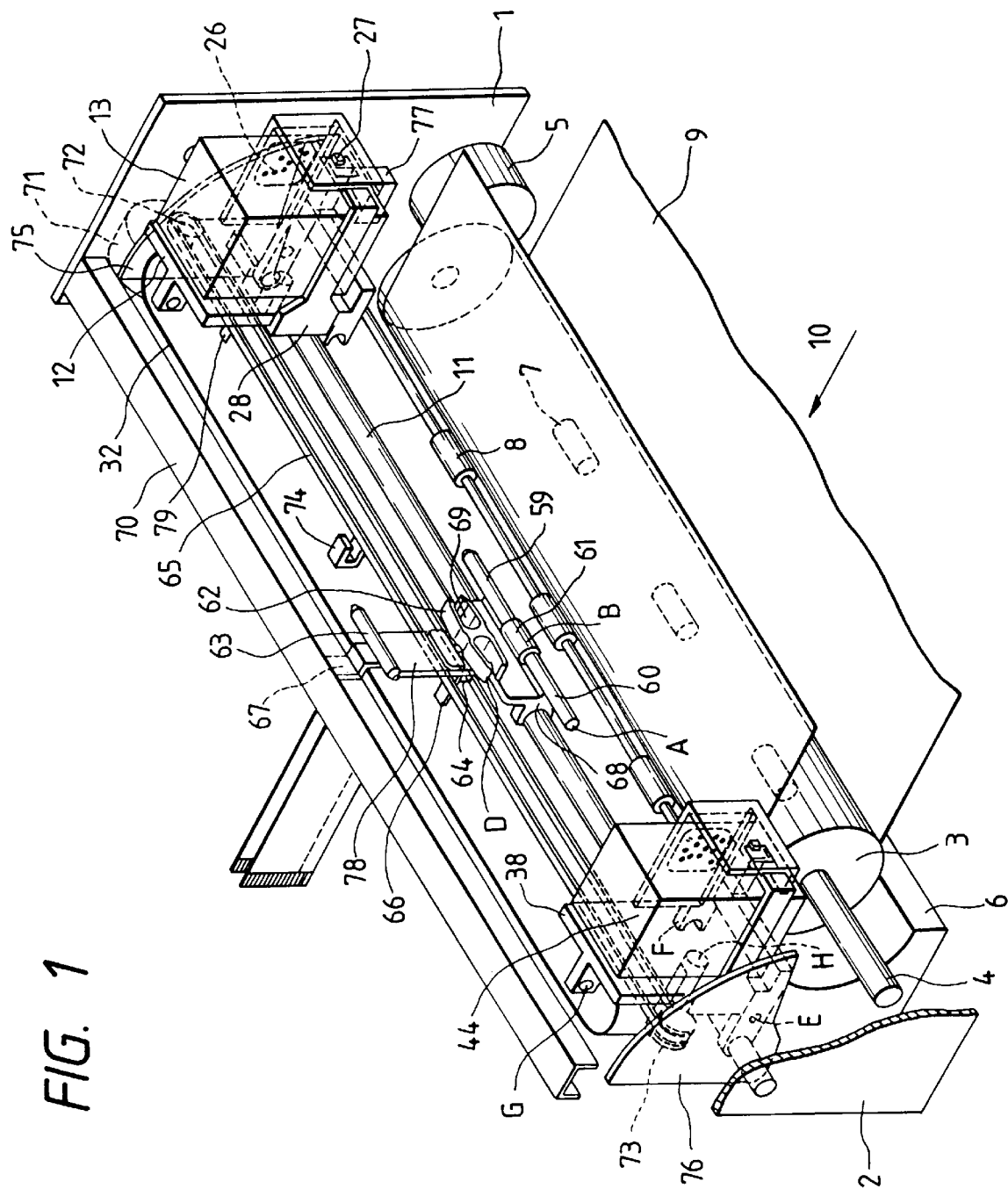
FIG. 1 is a perspective view showing the first embodiment of the entire equipment according to the present invention.
Figure 2:
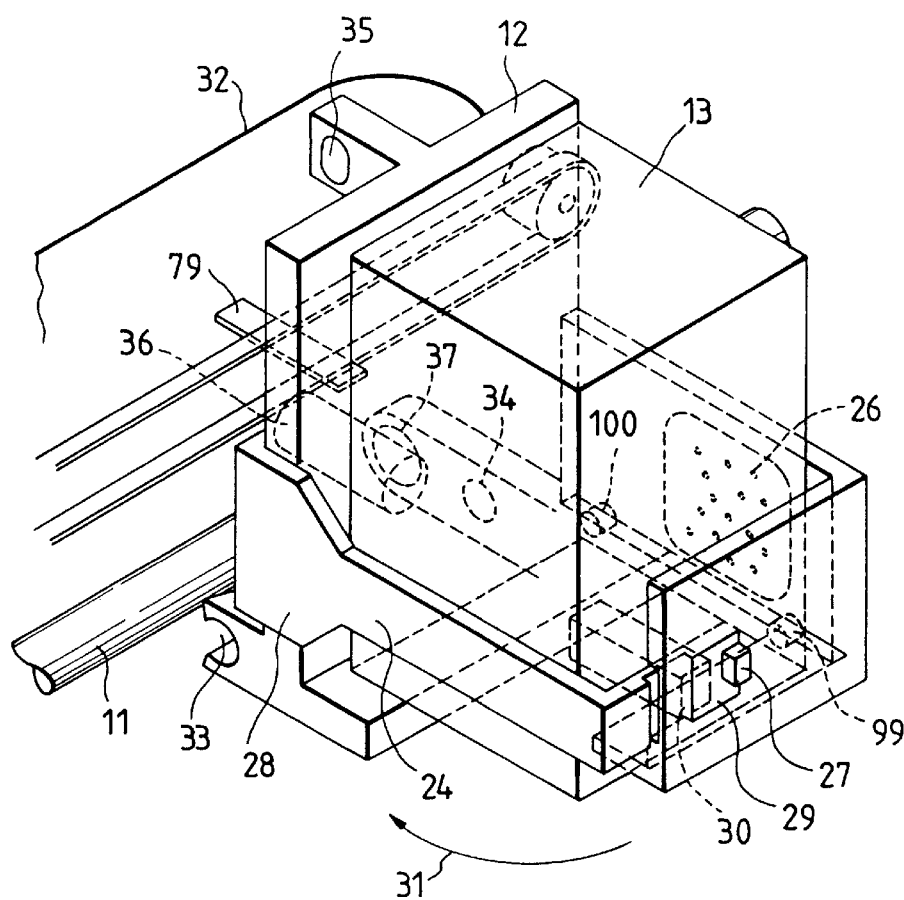
FIG. 2 is a perspective view of a black ink carriage shown in FIG. 1.
Figure 3:
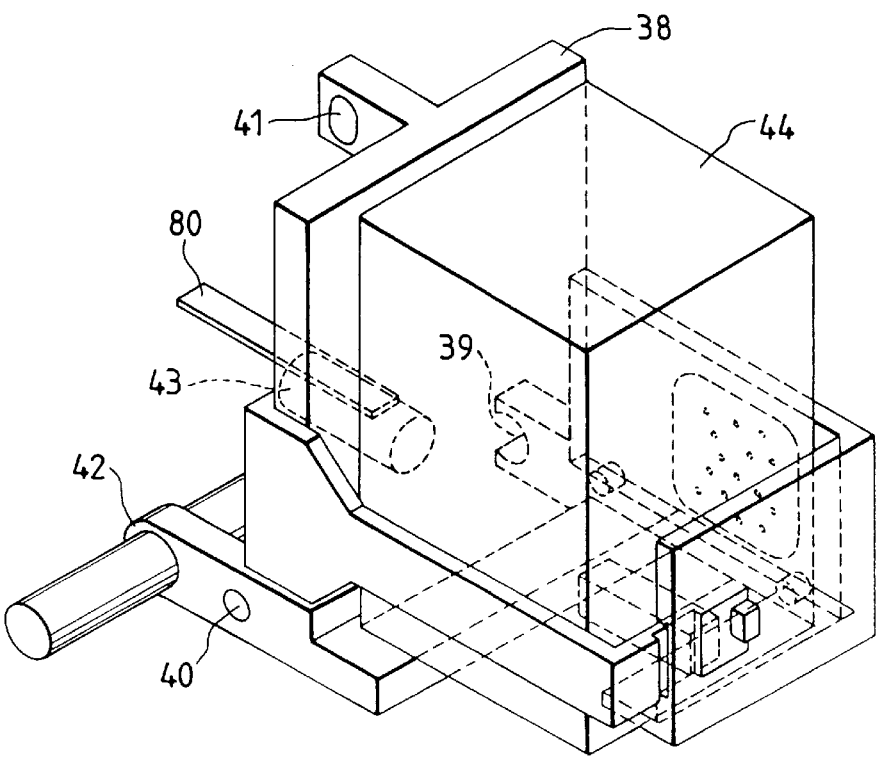
FIG. 3 is a perspective view of a color ink carriage shown in FIG. 1.

The first embodiment of an equipment according to the present invention will be described below with reference to FIGS. 1 to 6. FIG. 1 is a perspective view showing the entire embodiment in which the present invention is applied to an ink-jet recording apparatus as an equipment.

The apparatus comprises a right side plate 1, a left side plate 2, and a platen roller 3 whose surface consists of an elastic member such as rubber. A platen roller shaft 4 is formed at the center of the platen roller, and its right and left ends are respectively supported by the right and left side plates 1 and 2. A paper feed motor 5 is supported by the right side plate 1, and rotates the platen roller shaft 4 via a gear train (not shown). A paper guide 6 surrounds the circumferential surface of the platen roller 3. Pinch rollers 7 and 8 are pressed against the surface of the platen roller 3 at a predetermined pressure using springs (not shown). A recording paper sheet 9 as a recording medium is fed from the direction of an arrow 10, is inserted from a portion between the platen roller shaft 4 and the paper guide 6, is clamped between the pinch rollers 7 and 8, and the platen roller shaft 4, and is conveyed while being bent in a U shape. A guide shaft 11 serving as a guide mechanism has a diameter of 10 mm, and its end portions are supported by the right and left side plates 1 and 2. Note that the recording operation onto a medium to be fed by an ink-jet recording head or an image reading operation from a medium to be fed by a reading head need not always be performed on the medium to be fed on a region supported by the circumferential surface of the platen roller 3. For example, such an operation may be performed on the medium to be fed on a region which is not supported by another member such as the platen roller 3 (the rear surface of the medium to be fed does not contact another member).

A black ink carriage 12 serves as a functional element mounting carriage. The black ink carriage 12 will be described in detail below with reference to FIG. 2. The black ink carriage 12 mounts a black ink cartridge 13. A cartridge hook 24 presses the cartridge 13 against a contact portion 26 located inside the carriage 12. When a button 27 is depressed, a lock portion 30 disengages from a rectangular hole 29 formed on the carriage 12, and the hook 24 is opened while pivoting about a fulcrum 28 in the direction of an arrow 31. In the opening state of the hook 24, the black ink cartridge 13 is inserted into the carriage 12 from above, and when the hook 24 is closed, the cartridge 13 is pressed against the contact portion 26 and is fixed. Pins 99 and 100 project from the carriage 12, and are fitted in alignment holes of an aluminum plate (to be described later) attached to the cartridge 13. The cartridge 13 is aligned when it abuts against the base portions of the pins 99 and 100. A flexible cable 32 bends to follow the movement of the carriage 12. The flexible cable 32 is formed with the above-mentioned contact portion 26 at its end portion, is arranged in the carriage 12, and supplies an ink ejection signal as a functional element driving signal from a circuit board (not shown) to the cartridge 13. The carriage 12 has fitting holes 33, 34, and 35 and a grip portion 36, which are used for integration with a scanner 78 as a carrier to be described later. The hole 35 is a vertically elongated hole, and the grip portion 36 externally projects from the wall portion of the carriage 12. A hole 37 formed on the carriage 12 receives the guide shaft 11, and its inner diameter is set to be 10.2 mm so as not to generate a frictional load upon integration with the scanner 78. When the guide shaft 11 is fitted in the hole 37, the carriage 12 swingably engages with the guide shaft 11 as a guide mechanism, and is held above a cap 77 serving as the first standby portion while its downward swing movement is regulated. A black carriage sensor shielding plate 79 shields light emitted by a light transmission type home position sensor 74 (to be described later).

Referring back to FIG. 1, a color ink carriage 38 mounts a color ink cartridge 44. The carriage 38 will be described below with reference to FIG. 3. Since the carriage 38 has a shape similar to that of the black ink carriage 12 shown in FIG. 2, only a difference will be explained below. Fitting holes 39, 40, and 41 are used for integration with the scanner 78. The positions of the fitting holes 39 and 40 are reversed to those of the fitting holes 33 and 34 of the black ink carriage 12 in the horizontal direction. The hole 41 is a vertically elongated hole. A grip portion 43 externally projects from the wall portion of the carriage 38. A color carriage sensor shielding plate 80 is used for shielding light emitted by the home position sensor. The carriage 38 has a hole similar to the hole 37 of the carriage 12, and when the guide shaft 11 is fitted in this hole, the carriage 38 swingably engages with the guide shaft 11 as the guide mechanism. A portion above a cap (not shown), which is arranged at the position opposing the carriage 38 in FIG. 1 and is similar to the cap 77, serves as the second standby portion, and at this portion, the carriage 38 is held while its downward swing movement is regulated.

The black ink cartridge 13 has an ink tank for storing a black ink, and an ink-jet recording head serving as a functional element for ejecting the black ink. The ink-jet recording head preferably comprises a head which performs a required image recording operation onto a recording medium by ejecting an ink from ink ejection orifices using energy obtained from electro-thermal conversion elements (e.g., heaters) or electromechanical conversion elements (e.g., piezoelectric elements) arranged in ink channels.

A heat radiation aluminum plate (not shown) attached to the cartridge 13 is formed with alignment holes for the carriage 12. Furthermore, a circuit board having contacts (not shown) corresponding to the contact portion 26 is fixed to be parallel to the aluminum plate.

The color ink cartridge 44 has a black ink tank, a color ink tank, and a color ink-jet recording head as a functional element. These ink tanks are detachable from the color recording head, so that only an ink tank in which a stored ink is used up can be exchanged. The structure in the ink tank is the same as that of the black ink cartridge 13. In the color ink tank, yellow, magenta, and cyan ink storage regions are formed, and these inks are supplied to the ink-jet recording head via ink supply ports.

Note that each of the cartridges 13 and 44 is a member comprising at least an ink-jet recording head as a functional element, and includes an integral formation mode of an ink tank portion and an ink-jet recording head portion and a separable mode of the ink tank portion and the ink-jet recording head portion. Furthermore, as a mode to which the present invention is applied, only the ink-jet recording head portion may be held by the carriage, and the ink tank portion may be mounted on the equipment side.

The scanner 78 serving as the scanning type carrier will be described below with reference to FIG. 1 again. Referring to FIG. 1, right and left bearings 69 and 68 of the scanner 78 are fitted on the guide shaft 11. An upper guide 67 slides along a rail 70. A belt 65 is fixed to a belt stopper 64 serving as a driving force receiving portion which is located at a middle position in the main scanning direction of the scanner 78. One end side of the belt 65 is looped on a motor pulley 72, and the other end side is looped on a tension pulley 73 which is biased by a spring (not shown) in a direction to tension the belt. When a carrier motor 71 is driven, the scanner 78 is moved in the main scanning direction. A sensor shielding plate 66 shields the optical path of the light transmission type home position sensor 74 to generate an output signal used for position control of the scanner 78.

Figure 6:
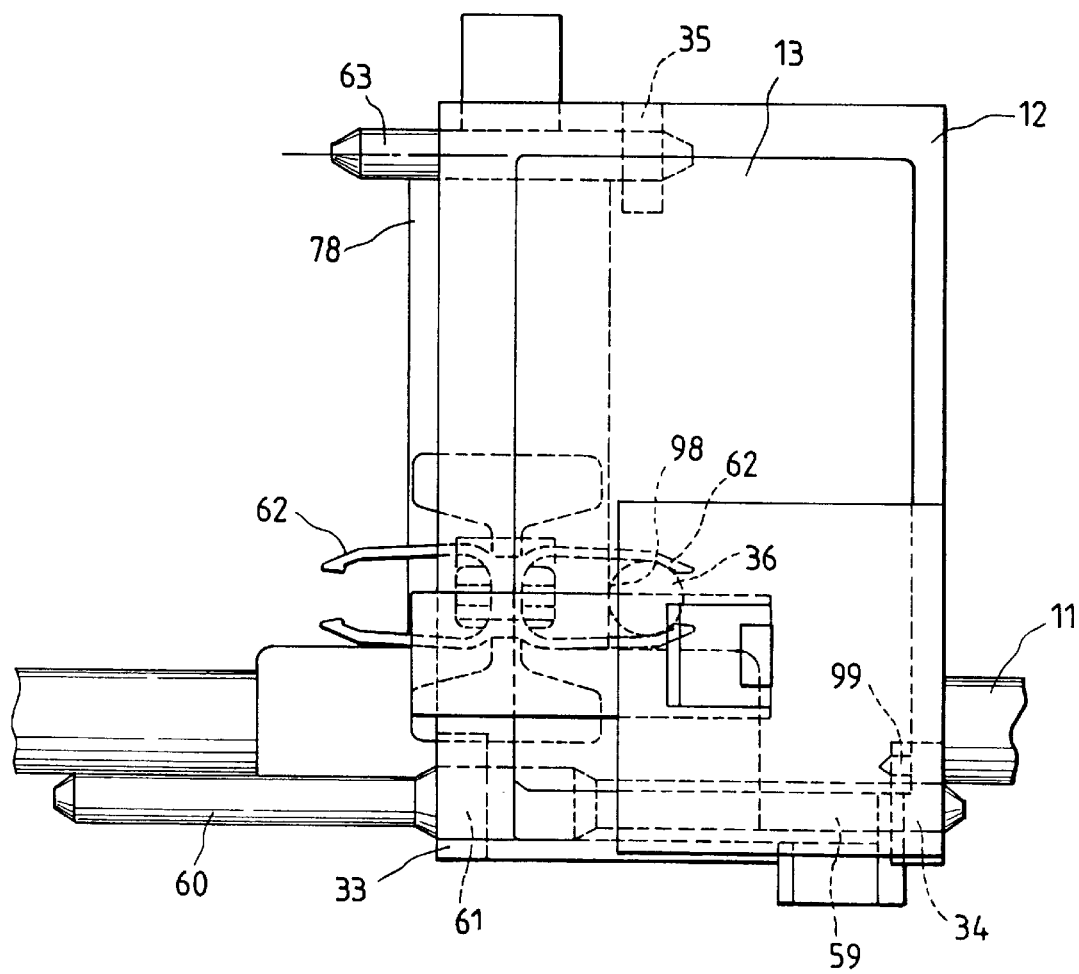
FIG. 6 is a front view for explaining the connected state between the black ink carriage and the carrier shown in FIG. 1.

A resin gripper 62 serves as a gripping member arranged on the scanner 78, and grips the grip portions 36 and 43 as the members to be gripped arranged on the black ink carriage 12 and the color ink carriage 38 using a forked claw. FIG. 6 shows a state wherein the scanner 78 is connected to the black ink carriage 12. The grip portion 36 of the carriage 12 abuts against and is held by a stopper portion 98 of the scanner 78. More specifically, the cartridge 13 is aligned to the carriage 12 when it abuts against the base portions of the alignment pins 99 and 98, and the carriage 12 is aligned to the scanner 78 when it abuts against the stopper portion 98. With this alignment, a recording operation performed during scanning of the scanner 78 can be performed at an accurate position on the recording paper sheet 9. In a state wherein the scanner 78 grips the grip portion 36 of the black ink carriage 12, fitting shafts 59, 61, and 63 of the scanner 78 are respectively fitted in the fitting holes 34, 33, and 35, and the scanner 78 and the carriage 12 can be scanned integrally. When the color ink carriage 38 and the scanner 78 are integrated, the gripper 62 grips the grip portion 36, and a fitting shaft 60 and the fitting shafts 61 and 63 of the scanner 78 are respectively fitted in the fitting holes 40, 39, and 41 of the color ink carriage 38, thus similarly allowing a scanning operation. The gripper 62 and the fitting shafts 59, 61, and 63 constitute an engaging mechanism for regulating the swing movement of the carriages 12 and 38 when the carriage 12 or 38 located above the cap as the first or second standby portion is connected to the scanner 78.

A resin black gripper 75 serves as a first standby gripping member for restraining the black ink carriage 12 at the position shown in FIG. 1, and a color gripper 76 serves as a second standby gripping member for similarly restraining the color ink carriage 38 at the position shown in FIG. 1. The shapes of the black gripper 75 and the color gripper 76 have a mirror-image relationship therebetween, and their operations are the same. For this reason, only the black gripper 75 will be explained below.

Figure 4A:
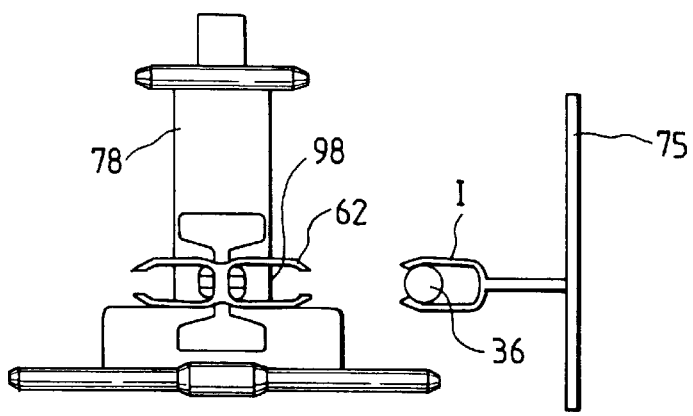
FIGS. 4A, 4B, 4C, and 4D are front views of principal part for explaining the connecting operation between the black ink carriage and a carrier shown in FIG. 1.
Figure 4B:
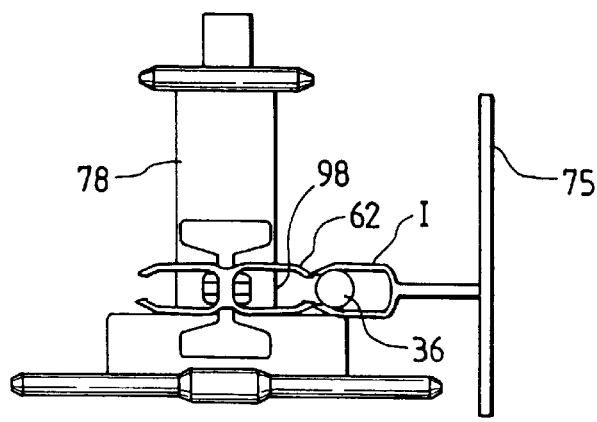
Figure 4C:
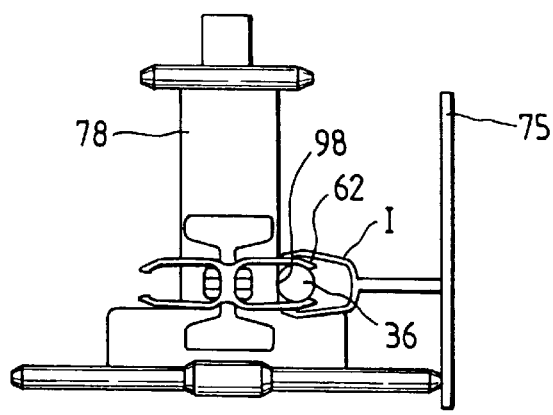
Figure 4D:
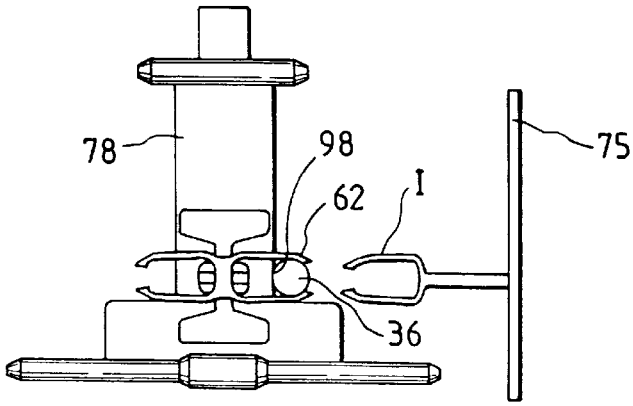
Figure 5B:
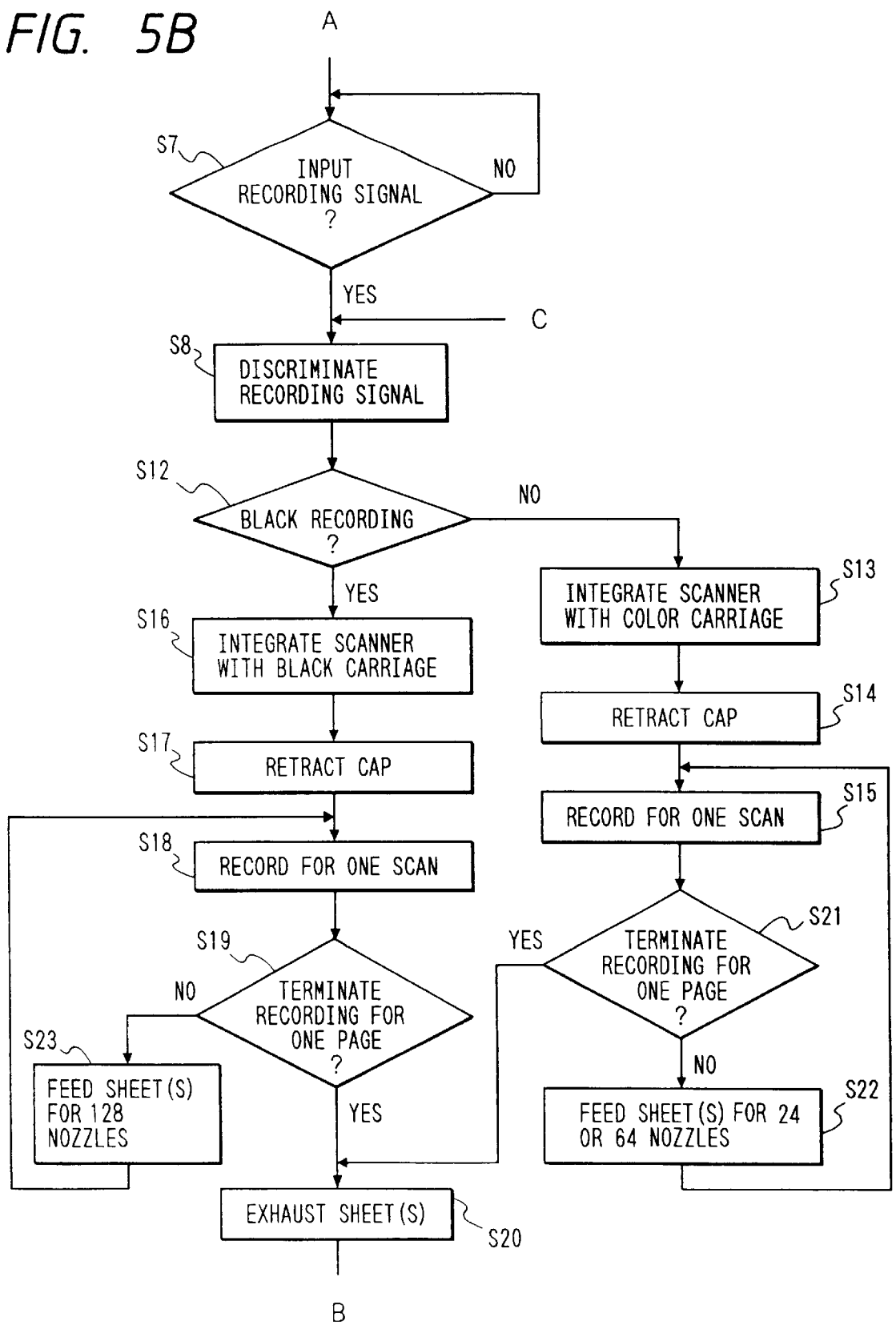
FIG. 5 is comprised of FIGS. 5A, 5B and 5C showing flow charts for explaining the operation of the first embodiment of the equipment according to the present invention.
Figure 5C:
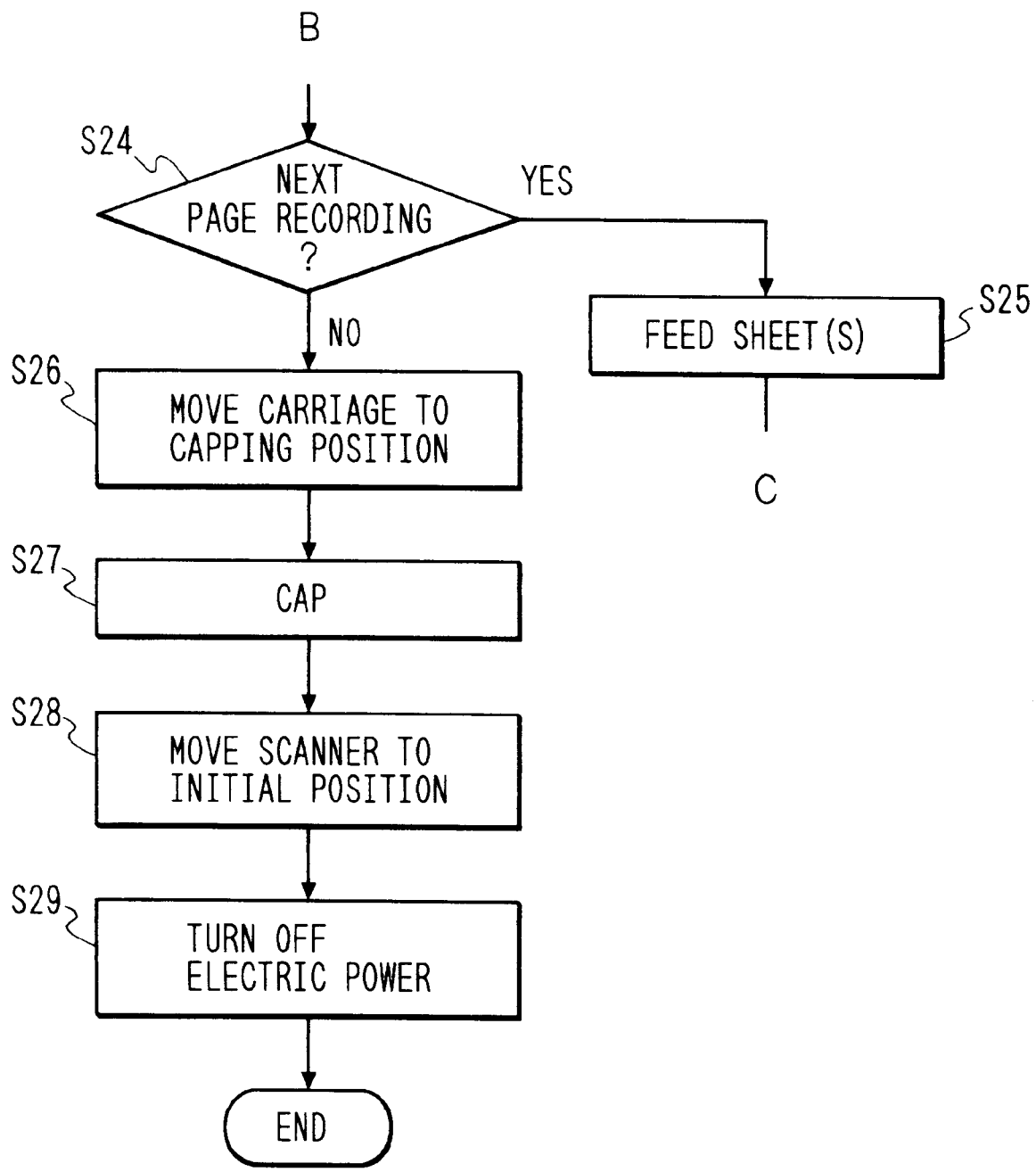

FIGS. 4A to 4D are front views showing the relationship among the grip portion 36 of the black ink carriage 12, the gripper 62, and the black gripper 75, and the housing of the carriage 12 except for the gripper 36 is not shown. FIG. 4A shows a state wherein the black gripper 75 restrains the carriage 38. A forked claw I of the black gripper 75 is deformed to open outwardly since it grips the grip portion 36. FIG. 4B shows a state wherein the scanner 78 has approached the carriage 12. The forked claw of the gripper 62 is about to enter inside the opened claw I of the black gripper 75. FIG. 4C shows a state wherein the scanner 78 has further approached. The gripper 62 grips the grip portion 36, and the claw I of the black gripper 75 is further spread out. Thereafter, when the scanner 78 moves in the opposite direction, as shown in FIG. 4D, the carriage 12 is scanned integrally with the scanner 78. Thereafter, when the scanner 78 moves to the right once again, the carriage 12 moves from the scanner 78 to the black gripper 75 in a procedure opposite to that described above.

When the gripper 62 engages with the black gripper 75, the scanner 78 can draw the carriage 12 by traction, and when the gripper 62 disengages from the black gripper 75, disconnection/release of traction between the scanner 78 and the carriage 12 is attained. Every time the scanner 78 approaches the black gripper 75, the carriage 12 is transferred to the scanner 78.

Referring to FIG. 1, the cap 77 caps the ink ejection orifices of the recording head on the black ink cartridge 13 to prevent an ink inside the ink ejection orifices from being dried. A cap (not shown) is similarly arranged for the color ink cartridge 44. The cap 77 is brought into contact with the head surface with the ink ejection orifices of the recording head on the black ink cartridge 13 by means of, e.g., a cam (not shown) to cap the ink ejection orifices when the black ink carriage 12 is restrained by the black gripper 75 and is located at the capping position. When the carriage 12 is unrestrained from the black gripper 75 by connection traction with the scanner 78, and the carriage 12 is separated from the black gripper 75, the cap 77 is separated from the head surface to release the capping operation of the ink ejection orifices.

The operation will be described below with reference to FIGS. 1 and 5A to 5C.

Before an electric power supply is turned on, the scanner 78 stands still at a position separated by 50 mm to the left in FIG. 1 from a position where the shielding plate 66 shields the optical path of the home position sensor 74. In this position, the black ink carriage 12 and the color ink carriage 38 are respectively located at the corresponding capping position, and their cartridges 13 and 44 are capped.

When the electric power supply is turned on, the scanner 78 moves to the right by 100 mm toward the black ink carriage 12 side (Bk side) (steps S1 and S2). At this time, the number of times of shielding of the optical path of the home position (HP) sensor 74 is counted. If the count is 1, the moving direction of the scanner 78 is reversed and the scanner 78 moves to the left (step S5). Then, the scanner 78 stops at a position separated by 50 mm from the position where the optical path of the sensor 74 is shielded again (to be referred to as an initial position hereinafter) (step S6). On the other hand, if the optical path of the sensor 74 is shielded twice, it is determined that the black ink carriage 12 or the color ink carriage 38 is connected to the scanner 78, and the ON/OFF timing of the detection signal from the sensor 74 is discriminated. When the scanner 78 is connected to the carriage 12, the shielding plates 66 and 79 are separated by 20 mm, and when the scanner 78 is connected to the carriage 38, the shielding plates 66 and 80 are separated by 6 mm. When the scanning speed of the scanner 78 is a predetermined one, or when the scanning speed of the scanner 78 can be detected, which of the carriages 12 and 38 is connected to the scanner 78 can be discriminated depending on the shielding timings of the optical path of the sensor 74 by the respective shielding plates.

When the black ink carriage 12 (to be also referred to as a Bk carriage or a black carriage hereinafter) is connected to the scanner 78, the black ink carriage 12 is moved to the capping position after the shielding plate 66 passes the sensor 74 (step S4 and S11). After the carriage 12 is restrained by the black gripper 75, the moving direction of the scanner 78 is reversed and the scanner 78 moves to the left (step S5). The scanner 78 then stops at the initial position after the optical path of the sensor 74 is shielded again (step S6). On the other hand, when the color ink carriage 38 is connected to the scanner 78, the moving direction of the scanner 78 is reversed at a position where the scanner 78 moves to the right by 50 mm after the shielding plate 66 passes the sensor 74, and the scanner 78 moves to the left (step S9). Then, the color ink carriage (also referred to as a color carriage hereinafter) 38 is moved to the capping position (step S10). After the color carriage 38 is restrained by the color gripper 73, the moving direction of the scanner 78 is reversed again (step S5), and the scanner 78 then stops at the initial position (step S6).

In this manner, when neither of the carriages 12 and 38 are connected to the scanner 78, only the scanner 78 moves and stops at the initial position. When the carriage 12 or 38 is connected to the scanner 78 in a power-OFF state inadvertently, after the carrier 12 or 38 is brought to the corresponding capping position and is restrained by the corresponding gripper, only the scanner 78 moves to and stops at the initial position.

When a recording signal is input, it is checked if the recording signal is a black recording signal of, e.g., a text, ruled lines, and the like, or is a color image signal (steps S7 and S8). If the recording signal is a black recording signal, the scanner 78 scans to the capping position of the black carriage 12 and is integrated with the black carriage 12 (step S16); if the recording signal is a color image signal, the scanner 78 scans to the capping position of the color carriage 38 and is integrated with the color carriage 38 (step S13). At the same time, the cap is retracted from the cartridge 13 or 44 used in recording (step S17 or S14). In a recording operation using the black carriage 12, the recording operation is performed using 128 ink ejection nozzles (ink ejection orifices) aligned along the feed direction of the recording paper sheet 9. After a recording operation for one scan is completed (step S18), the recording paper sheet 9 is fed by a length corresponding to the 128 nozzles (steps S19 and S23), and a scanning operation for the next recording operation is performed (step S18). Upon completion of recording for one page, the recording paper sheet 9 is exhausted (steps S19 and S20). If the recording operation is to continue, another recording paper sheet 9 is fed (steps S24 and S25). If the recording operation is to end, the scanner 78 moves until the black carriage 12 is located at the capping position (step S26). After the black carriage 12 is restrained by the black gripper 75 and the ink ejection orifices on the head surface of the cartridge 13 is capped by the cap 77 (step S27), the scanner 78 scans to and stops at the above-mentioned power-OFF position (step S28). Thereafter, the electric power supply is turned off (step S29). On the other hand, in a recording operation using the color carriage 38, for a color image region, the respective color inks are ejected on the basis of the recording signal in the order of black, cyan, magenta, and yellow to overlap each other so as to obtain desired colors while feeding the recording paper sheet 9 by a length corresponding to 24 nozzles, and for a black image region, the recording operation is performed using 64 black nozzles while feeding the recording paper sheet 9 by a length corresponding to 64 nozzles (step S22).

The scanner 78 and the carriage 12 or 38 cannot be easily separated due to the resiliency of the forked claw of the gripper 62. However, since the scanner and the carriage may be separated by, e.g., a user's touch, it is monitored if the optical path of the sensor 74 is shielded twice at predetermined timings during one scan of the scanner 78. If the optical path of the sensor is shielded only once, it is determined that the scanner 78 is separated from the carriage 12 or 38, and the control enters a relief sequence by stopping the scanner 78. When the recording operation has been performed using the black carriage 12 immediately before this decision, the scanner 78 moves to the right by 350 mm or equivalent. During this movement, the gripper 62 contacts the grip portion 36, and pushes the black carriage 12 to move it to the right. Thereafter, the grip portion 36 contacts the forked claw I of the black gripper 75, and the grip portion 36 is gripped by the black gripper 75. When the scanner 78 further moves to the right, the claw of the gripper 62 enters inside the claw I of the black gripper 75. The carrier motor 71 stops after it steps out by an amount corresponding to the extra movement. Then, the moving direction of the scanner 78 is reversed, and the scanner 78 moves to the left together with the black carriage 12. The scanner 78 then stops at the initial position after it passes the sensor 74. At the same time, the platen roller 3 is rotated to exhaust the paper sheet, and another paper sheet 9 is fed to prepare for the next recording operation. On the other hand, when the recording operation has been performed using the color carriage 38 immediately before the above decision, the scanner 78 moves to the left by 350 mm. The following process is the same as that in the above-mentioned relief sequence for the black carriage 12. In this manner, even when the scanner 78 is separated from the carriage 12 or 38 inadvertently, the relief sequence is automatically executed to allow execution of the recording operation.

As described above, in this embodiment, a carriage which mounts a functional element suitable for the type of recording is selected in correspondence with the type of a recording signal, and the recording operation is performed using the selected carriage. Such a selection may be made in correspondence with the operation mode of the recording apparatus. In this embodiment, as the recording head on the color ink cartridge 44, a head on which different color ink ejection nozzles are aligned vertically (along the feed direction of the medium to be fed) is used. For this reason, the width of the recording head can become smaller than a head on which nozzles are aligned horizontally, and the entire apparatus can be rendered compact.

In this embodiment, the first and second standby portions where the carriages 12 and 38 stand by or are held are arranged to be separated from each other toward the two end portion sides in the scanning direction of the scanner 78. For this reason, by only scanning the scanner 78 in one or the other direction, the carriage 12 or 38 can be easily attached/detached to/from the scanner 78. As a result, the arrangement of the entire apparatus can be simplified and made compact.

As can be seen from FIG. 6, in the connected state of the scanner 78 and the carriage 12, the middle portion, in the main scanning direction, of the scanner 78 is included in a projected space of the carriage 12 in a direction perpendicular to the scanning direction of the scanner 78, i.e., in a projected space of the carriage 12 in a direction perpendicular to the plane of the drawing of FIG. 6 (at a position concealed behind the carriage 12 when FIG. 6 is viewed from the front side). When FIG. 6 is viewed from the front side, the center of gravity of the scanner 78 is present at this middle portion. As described above, since the belt stopper 64 (see FIG. 1) as the driving force receiving portion of the scanner 78 is located at the middle portion, in the right-and-left direction, of the scanner 78, the belt stopper 64 is inserted in the projected space of the carriage 12, as a matter of course. This structure decreases the distance between the belt stopper 64 for receiving the driving force and the center of gravity of the carriage 16, and reduces the moment generated between the belt stopper 64 and the bearings 68 and 69 upon scanning of the scanner 78 together with the carriage 12. Therefore, this structure advantageously attains a smooth scanning operation of the scanner 78 and the carriage 12. Also, since the grip position of the gripper 62 and the grip portion 36 is located in the projected space of the carriage 12, generation of a vibration of the carriage 12 can be suppressed upon scanning of the carriage 12 together with the scanner 78. The same applies to the coupled state of the scanner 78 and the carriage 38. In addition, since the middle position, in the right-and-left direction, of the scanner 78 is selectively utilized as an accommodation space for both the carriages 12 and 38, the scanner 78 can be rendered compact in the right-and-left direction.

Furthermore, when the scanner 78 is coupled to the carriage 12, the positional relationship among the gripper 62 and the fitting shafts 59, 61, and 63 on the scanner 78 side, and the grip portion 36 and the fitting holes 34, 33, and 35 on the carriage 12 side is preferably determined to define the following fitting order of these members. First, the fitting shaft 63 is fitted in the fitting hole 35 as the elongated hole to align the carriage 12 in the direction perpendicular to the plane of the drawing of FIG. 6. Thereafter, the fitting shafts 59 and 61 are fitted in the fitting holes 34 and 33 to align the carriage 12 in the vertical direction of FIG. 6. Thereafter, or at the same time, the grip portion 36 grips the gripper 62. In this manner, before the grip portion 36 grips the gripper 62 as engagement for traction/disconnection of the scanner 78 with respect to the carriage 12, the carriage 12 is aligned to regulate the relative positional relationship between the carriage 12 and the scanner 78, thus assuring engagement for traction/disconnection. The same applies to the connection between the scanner 78 and the carriage 38. In FIG. 1, the fitting shafts 60, 61, and 63 and the gripper 62 on the scanner 78 side are assigned with symbols A, B, C, and D, and the fitting holes 39, 40, and 41 and the grip portion 43 on the carriage 38 side corresponding to the former members are assigned with symbols E, F, G, and H.

In this embodiment, the ink cartridges 13 and 44 are mounted on the carriages 12 and 38. Alternatively, the cartridges 13 and 44 or the recording heads themselves may be transferred and selectively connected to the scanner 78 without using the carriages 12 and 38. In this embodiment, the gripper 62 having the forked resin claw is used as the means for connecting the carriage 12 or 38 to the scanner 78 and means for restraining the carriage 12 or 38 at the capping position. However, the present invention is not limited to these details. For example, connection/disconnection means based on a method of opening/closing a forked claw using a solenoid, a method utilizing an attractive force between an electromagnet and a metal, and the like are included as practical means.

The functional element is not particularly limited to the recording head. For example, when an image reading sensor is used as the functional element, an image reading apparatus may be realized. One of the carriages 12 and 38 may be used as a carriage exclusively used for an ink-jet recording head, and the other may be used as a carriage exclusively used for an image reading head. Alternatively, the carriages 12 and 38 may mount the same functional elements, and one of these carriages may be used as an auxiliary carriage. Furthermore, as the functional elements, image reading heads with different resolutions such as 300 dpi, 350 dpi, 600 dpi, and 720 dpi may be exchangeably used, or recording heads using different types of inks to be ejected, e.g., a recording head for ejecting a dense black ink, a recording head for ejecting yellow, magenta, and cyan inks, a recording head for ejecting yellow, magenta, cyan, and black inks, and a recording head for ejecting a light black ink may be exchangeably used. Of course, as the recording head, various other types of recording heads such as a thermal head may be used.

Furthermore, an auto changer for selectively moving a plurality of functional elements to a portion at the end portion side in the scanning direction of the scanner 78 may be arranged, and the functional element which is moved by the auto changer to the portion at the end portion side in the scanning direction may be connected to the scanner 78.

(Second Embodiment)

Figure 7:
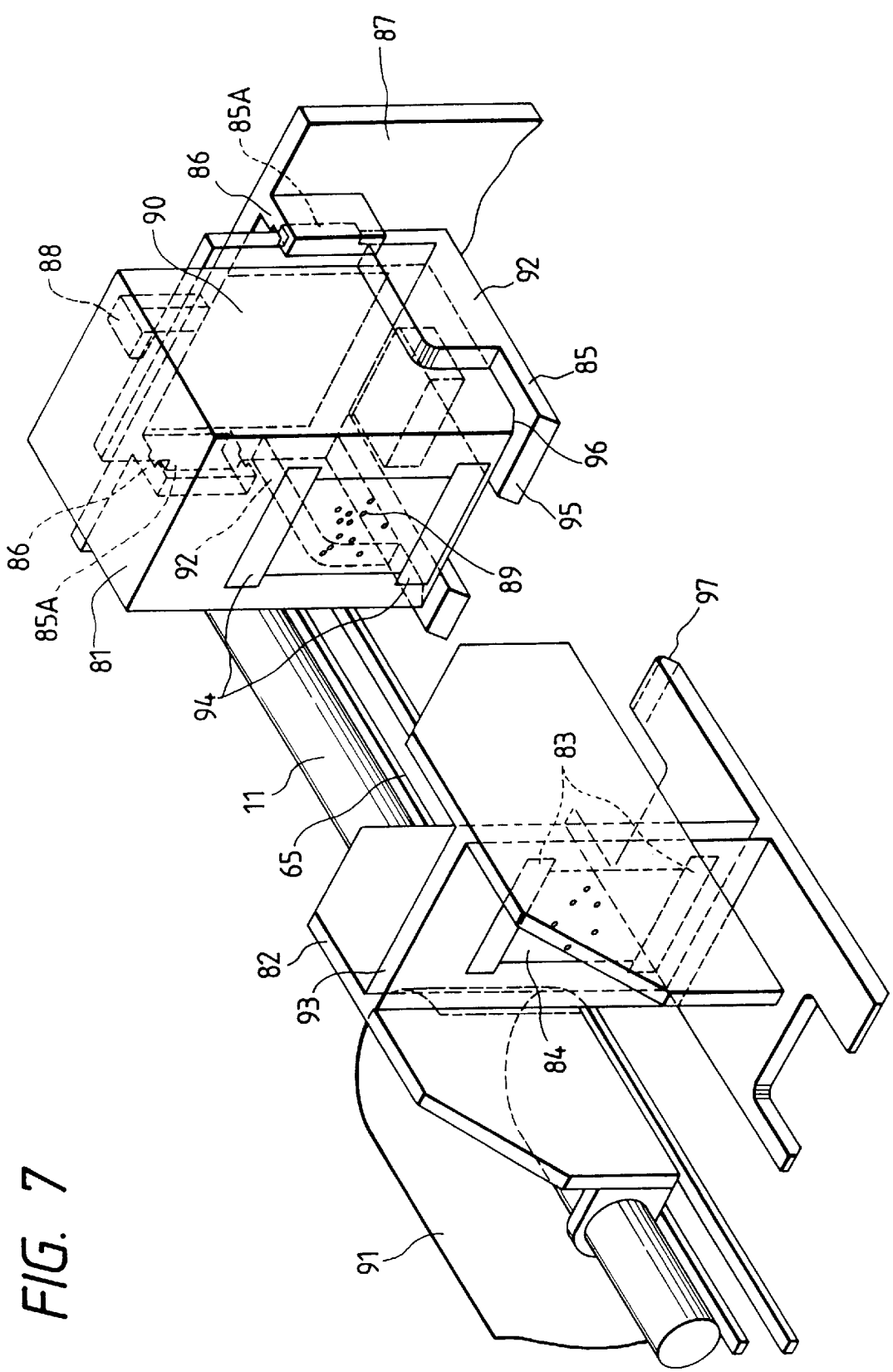
FIG. 7 is a perspective view showing principal part of the second embodiment of an equipment according to the present invention.

Referring to FIG. 7, a black ink cartridge 81 has the same arrangement as that of the black ink cartridge 13 in the first embodiment. The cartridge 81 is mounted on a cartridge stacker 85. A tapered portion 96, which contacts a scanner 82 serving as a carrier (to be described later), is formed on the lower portion of the black ink cartridge 81. A magnet 90 is arranged on the cartridge stacker 85, and attracts an iron plate (not shown) provided on the surface of the black ink cartridge 81. The present invention is not limited to this iron plate as long as it consists of a material attractable by the magnetic force of the magnet 90. Guides 92 are formed on the cartridge stacker 85 to sandwich the cartridge 81, thereby aligning the cartridge 81. Ribs 85A are formed at the two ends of the cartridge stacker 85, and are fitted in groove portions 86 formed on a side plate 87. The cartridge stacker 85 is vertically slidable along the groove portions 86. The cartridge stacker 85 is biased upward by biasing means (not shown), and is fixed in position when it abuts against a stopper 88 projecting from the side plate 87. The stacker 85 is formed with a tapered portion 95 which contacts the scanner 82 (to be described later).

The scanner 82 serving as a carrier is supported by a guide shaft 11, and can be scanned by a belt 65 in the axial direction of the guide shaft 11. The scanner 82 has a shape axially symmetrical about a middle wall 93. A contact portion 84 has contact pieces on both the right and left surfaces of the middle wall 93. The contact pieces of the contact portion 84, and contact pieces 89 arranged on the side surface of the black ink cartridge 81 are located at the corresponding positions, and when these contact pieces contact each other, a recording signal is supplied from a flexible cable 91 to the black ink cartridge 81. An electromagnet 83 is embedded in the middle wall, and receives an ON/OFF signal of an electromagnetic force via the flexible cable 91. When the electromagnetic force is turned on, the electromagnet can attract and fix an iron plate 94 arranged on the cartridge 81. At the same time, this attraction force can satisfactorily attain an electrical connection between the contact portion 84 and the contact pieces 89. A tapered portion 97 on the scanner 82 side contacts the tapered portion 95 of the cartridge stacker 85. As in the first embodiment described above, a color ink cartridge (not shown) is mounted on another cartridge stacker (not shown) at the opposite side in the main scanning direction of the black ink cartridge 81. Since the black recording operation using the black ink cartridge 81 is the same as the color recording operation using the color ink cartridge in terms of the operation of the apparatus, only the black recording operation will be explained below.

When the electric power supply is turned on, the scanner 82 moves to the initial position, as in the first embodiment described above. When a recording signal is input, it is checked if the recording signal is a black or color recording signal, and thereafter, the scanner 82 moves toward the corresponding ink cartridge. In the case of the black recording, the scanner 82 moves toward the black ink cartridge 81, and the tapered portion 97 of the scanner 82 contacts the tapered portion 95 of the cartridge stacker 85. As a result, the stacker 85 moves downward, and the tapered portion 97 of the scanner 82 enters a portion between the tapered portions 95 and 96. Then, the cartridge 81 moves onto the scanner 82. When the electromagnet 83 is energized upon contact between the contact pieces 84 and 89, the cartridge 81 is fixed to the scanner 82. Since the attractive force of the electromagnet 83 is stronger than that of the magnet 90, when the scanner 82 is separated from the stacker 85 in this state, the cartridge 81 moves together with the scanner 82. After the scanner 82 and the cartridge 81 are integrated in this manner, the recording operation is started as in the first embodiment.

In this embodiment, since the single flexible cable 91 can be commonly used for the black ink cartridge 81 and the color ink cartridge, the arrangement of the apparatus can be simplified. Since the ink cartridge is directly attached/detached to/from the scanner 82, the ink capacity can be increased by an amount corresponding to the weights of the carriages, and hence, large-capacity ink cartridges can be used in recording. As a result, the running cost can be reduced, and the load of the cartridge exchange operation can be reduced.

In addition, the ink-jet recording apparatus of this embodiment may be used in the form of an image output terminal of an information processing equipment such as a computer, and may be used in the form of a copying machine combined with a reader or a facsimile apparatus having a transmission/reception function.

As described above, according to this embodiment, since the first and second standby portions are set to be separated from each other at one end portion side and the other end portion side in the scanning direction of the carrier, and the functional elements which stand by at these standby portions are selectively integrated with the carrier to be movable together, various operation modes corresponding to the types of the functional elements which move together with the carrier can be obtained. In addition, each functional element can be easily attached/detached to/from the carrier by scanning the carrier in one or the other direction. For these reasons, the arrangement can be simplified and made compact.

Since the guide mechanism swingably comprises the functional element mounting carriage, and the swing movement of the functional element mounting carriage is regulated by connecting the functional element mounting carriage to the carrier, the alignment precision of the carriage upon engagement between the carriage and the guide mechanism can be lowered to simplify the arrangement of the engaging portion, and high alignment precision can be assured when the carriage is connected to the carrier.

Since the driving force receiving portion of the carrier is located in the projected space of the carriage in the direction perpendicular to the scanning direction, the carrier can be smoothly scanned together with the carriage.

Since the relative positional relationship between the carriage and carrier is regulated before they engage with each other, their engagement can be reliably and smoothly attained.

Since the functional element and electrical contact pieces are aligned to each other by the carrier, an electrical connection between them can be reliably attained.

Since the guide mechanism swingably comprises the functional element mounting carriage, and the swing movement of the functional element mounting carriage is regulated by connecting the functional element mounting carriage to the carrier, the alignment precision of the carriage upon engagement between the carriage and the guide mechanism can be lowered to simplify the arrangement of the engaging portion, and high alignment precision can be assured when the carriage is connected to the carrier.

Since the ink-jet heads held at the first and second standby positions can be selectively scanned, and the cap mechanisms for capping these ink-jet recording heads are arranged, a recording operation can be performed using an optimal head corresponding to the recording contents, and the ink ejection orifices of the heads can be prevented from clogging by the cap mechanisms. With this arrangement, both a character recording mode, which is frequently used, and a color image recording mode can be realized at high speed. In addition, since heads, which are not used for recording, can be kept capped, the amount of ink consumed by the preliminary ejection and suction operations, and the time required for these operations can be eliminated, thus shortening the time required for recording.

Since the first standby position is defined as a standby position exclusively used for a carriage for mounting the ink-jet head, and the second standby position is defined as a standby position exclusively used for a carriage for mounting the functional element different from the ink-jet head, the head and the functional element different from the head can be selectively scanned as needed, thus obtaining various operation modes.

Since a functional element to be integrated with the carrier is selected in correspondence with the scan mode of the equipment or the driving signal for the functional element, an optimal functional element can be automatically selected and scanned.

What is claimed is:

1. An apparatus provided with a scanning coupling mechanism for scanning upon application of a drive force, said apparatus comprising:
    a first standby portion for holding a first carriage coupable with said scanning coupling mechanism at one side of said scanning coupling mechanism in a scanning direction;
    a second standby portion for holding a second carriage coupable with said scanning coupling mechanism at another side of said scanning coupling mechanism in the scanning direction;
    a guiding mechanism for supporting and guiding said scanning coupling mechanism between said first and second standby portions; and
    control means for controlling coupling of said scanning coupling mechanism with one of said first and second carriages so as to scan said first or said second carriage between said first and second standby portions.

2. An apparatus according to claim 1, wherein said first carriage comprises a mounting portion for mounting a head member and an electrical contact for supplying an electrical signal to said head member.

3. An apparatus according to claim 1, wherein said first and second carriages are swingably engaged with said guiding mechanism and said first and second standby portions have limiting mechanisms for limiting movement of said first and second carriages to said guiding mechanism.

4. An apparatus according to claim 1, wherein said scanning coupling mechanism comprises an engaging mechanism for limiting a swinging movement of said first and second carriages swingably engaged with said guiding mechanism by engaging said first and second carriages.

5. An apparatus according to claim 1, wherein said first and second carriages perform an engagement for limiting a position relative to said scanning coupling mechanism before receiving engagement by said scanning coupling mechanism.

6. An apparatus according to claim 1, wherein a head member mounted on one of said first and second carriages comprises a recording head for recording on a recording medium.

7. An apparatus according to claim 6, wherein said recording head comprises an ink jet recording head for discharging ink through an ink discharge port to record on the recording medium.

8. An apparatus according to claim 7, wherein said ink jet recording head discharges ink through the ink discharge port to record on the recording medium utilizing thermal energy generated by an electrothermal converting element.

9. An apparatus according to claim 11, wherein a head member mounted on one of said first and second carriages comprises a reading head for reading image information from an original.

10. An apparatus provided with a scanning coupling mechanism for scanning upon application of a drive force, said apparatus comprising:

a first standby position for holding a first carriage for mounting a first ink jet recording head and for coupling with said scanning coupling mechanism, said first standby position being disposed at one side of said scanning coupling mechanism in a scanning direction;

a second standby position for holding a second carriage for mounting a second ink jet recording head and for coupling with said scanning coupling mechanism, said second standby position being disposed at another side of said scanning coupling mechanism in a scanning direction;

a guiding mechanism for supporting and guiding said scanning coupling mechanism between said first and second standby positions;

a first cap mechanism for capping said first ink jet recording head when said first ink jet recording head is located at said first standby position;

a second cap mechanism for capping said second ink jet recording head when said second ink jet recording head is located at said second standby position; and control means for controlling coupling of said scanning coupling mechanism with one of said first and second carriages so as to scan said first or said second carriage between said first and second standby positions.

11. An apparatus according to claim 10, wherein said first and second ink jet recording heads discharge ink through ink discharge ports to record on a recording medium utilizing thermal energy generated by electrothermal converting elements.

12. An apparatus according to claim 10, wherein said first ink jet recording head is a recording head for recording in black and said second ink jet recording head is a recording head for recording in color.

13. A method for scanning carriages by using a scanning coupling mechanism for scanning upon application of a drive force and a first carriage and a second carriage for coupling with said scanning coupling mechanism, said method comprising the steps of:

coupling said scanning coupling mechanism with one of said first and second carriages; and controlling scanning of said scanning coupling mechanism so as to recouple said first carriage or said second carriage coupled with said scanning coupling mechanism in said coupling step upon determination that said first or second carriage is not coupled with said scanning coupling mechanism during scanning after said coupling step.

14. A method according to claim 13, wherein said first carriage and said second carriage are located at one end and another end of a reciprocal scan area of said scanning coupling mechanism, respectively, and when determined that said first or second carriage is not coupled with said scanning coupling mechanism in said controlling step, said scanning coupling mechanism moves to the reciprocal scan area where said first or second carriage to be coupled is located.

15. A method according to claim 13, wherein said first and second carriages are capable of mounting a recording head for recording on a recording medium.

16. A method according to claim 15, wherein said recording head comprises an ink jet recording head for discharging ink through an ink discharge port to record on the recording medium.

17. A method according to claim 16, wherein said ink jet recording head discharges ink through the ink discharge port to record on the recording medium utilizing thermal energy generated by an electrothermal converting element.

18. A method apparatus according to claim 13, wherein one of said first and second carriages comprises a reading head for reading image information from an original.

* * * * *

UNITED STATES PATENT AND TRADEMARK OFFICE
CERTIFICATE OF CORRECTION

PATENT NO. : 5,949,443
DATED : September 7, 1999
INVENTOR(S) : YAMAMOTO ET AL.

It is certified that error appears in the above-identified patent and that said Letters Patent is hereby corrected as shown below:

ON THE TITLE PAGE:

ITEM
[56] References Cited:
 FOREIGN PATENT DOCUMENTS, "1221251" should read --1-221251--.
 "2001327" should read --2-1327--.

COLUMN 14:
 Line 20, "coupable" should read --couplable--.
 Line 25, "coupable" should read --couplable--.
 Line 66, "claim 11," should read --claim 1,--.

Signed and Sealed this

Thirteenth Day of June, 2000

Attest:

Q. TODD DICKINSON

*Attesting Officer*　　　*Director of Patents and Trademarks*